Figure 1:
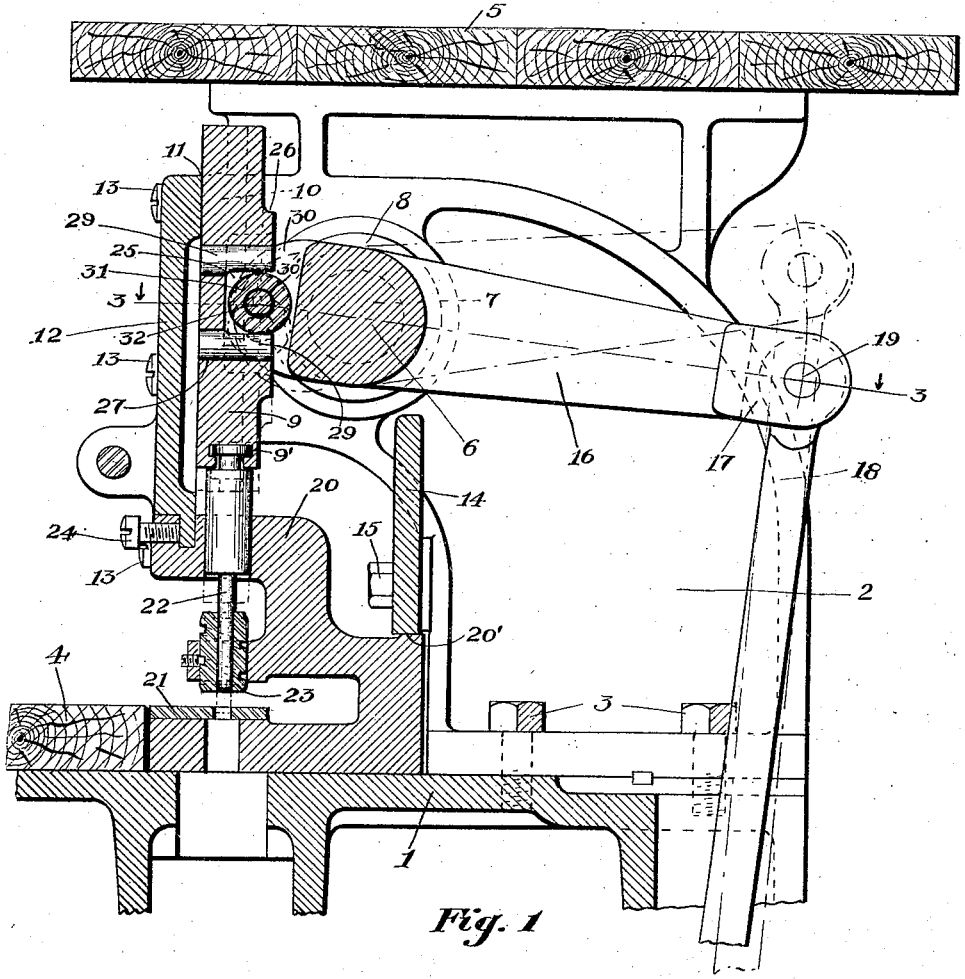

April 1, 1924.

E. A. SPAULDING 1,488,562

PUNCH ACTUATING MECHANISM FOR MULTIPLE PUNCHING MACHINES

Filed May 17, 1923   2 Sheets-Sheet 1

Inventor.
Eugene A. Spaulding

April 1, 1924.  
E. A. SPAULDING  
1,488,562  
PUNCH ACTUATING MECHANISM FOR MULTIPLE PUNCHING MACHINES  
Filed May 17, 1923  
2 Sheets-Sheet 2

Inventor:  
Eugene A. Spaulding

Patented Apr. 1, 1924.

1,488,562

UNITED STATES PATENT OFFICE.

EUGENE A. SPAULDING, OF PORTLAND, MAINE, ASSIGNOR TO SOUTHWORTH MACHINE CO., OF PORTLAND, MAINE, A CORPORATION OF MAINE.

PUNCH-ACTUATING MECHANISM FOR MULTIPLE-PUNCHING MACHINES.

Application filed May 17, 1923. Serial No. 639,583.

*To all whom it may concern:*

Be it known that I, EUGENE A. SPAULDING, a citizen of the United States, residing at Portland, in the county of Cumberland and State of Maine, have invented new and useful Improvements in Punch-Actuating Mechanism for Multiple-Punching Machines, of which the following is a specification.

My invention relates, principally, to improvements in the design and construction of the parts immediately connected with the actuation of the punch plate of these machines, or that member which carries the punches.

My object is to eliminate, so far as possible, all needless and excessive friction in these parts caused by their springing, thrusting, or being forced out of alinement, especially when under the strain of heavy punching operations.

In certain types of punching machines these punch plates are provided with gear-tooth racks near their ends, and into these mesh segmental gears formed on, and a part of, an oscillating shaft. The oscillations of this shaft produce a reciprocatory movement to the punch plate.

During that part of the stroke of the punches when the impact against the material to be punched takes place a very sudden and severe strain is put on the teeth of the racks and gears, often breaking them. Now, while these teeth may be designed sufficiently strong to withstand this shock, three difficulties arise, which, under the conditions present, are not so easily overcome.

First, the thrust, or the force tending to drive the gear away from the rack as the angular faces of the teeth in the two members strongly abut, springs the shaft and causes excessive wear in the teeth.

Secondly, the friction developed between the punch plate and the guides in which it reciprocates, occasioned by the thrusting action just referred to, produces a braking effect and impedes the free movement of the plate.

Thirdly, when one end of the punch plate is under greater strain than the other, due to heavier punching on that end, a twisting stress or distortion is placed on the shaft, which has the effect of changing the horizontal alinement of the teeth in the rack and the axial alinement of the teeth in the gears, resulting in greatly increased friction and often breakage of the teeth.

In my attempt to overcome these defects I have resorted to a rolling action contact between the oscillating and reciprocating members and have demonstrated in a practical way that I thereby greatly reduce the friction and thrust encountered in the previously mentioned method of operating, and by making the face of these rolls of a spherical shape, a slight distortion of the shaft will not produce a faulty situation between the rolls and their contacting surfaces on the punch plate.

Figure 2:
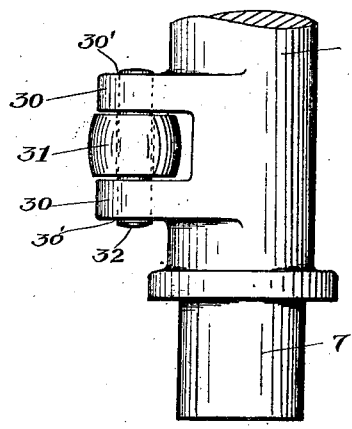
Figure 3:
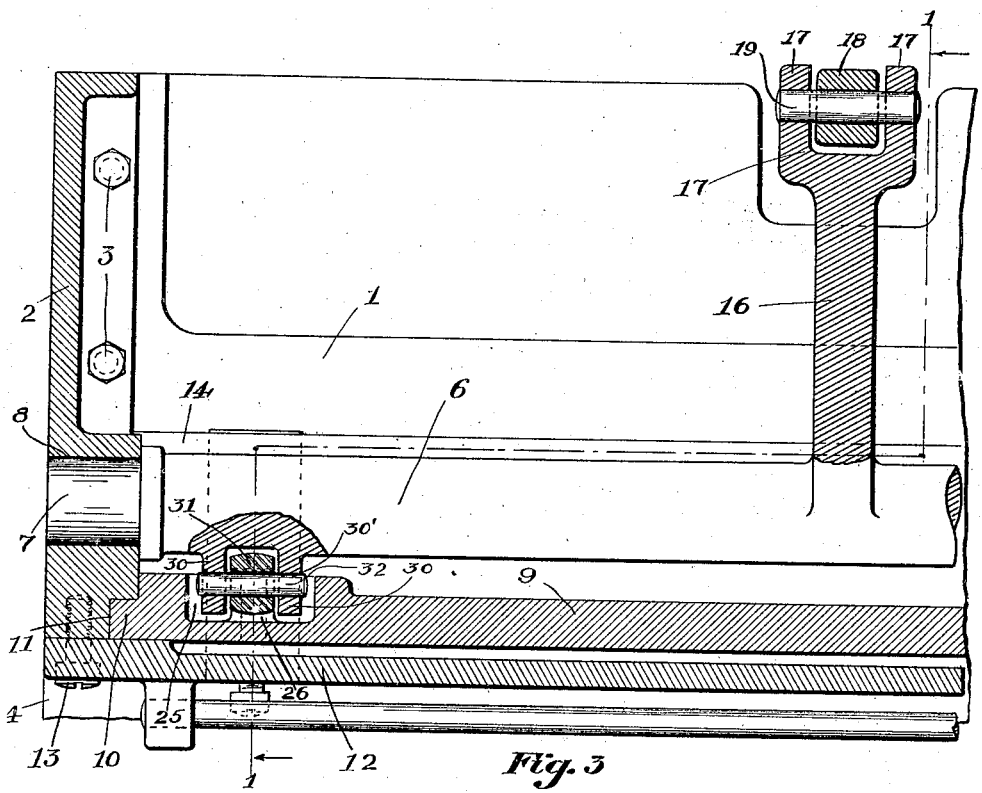
Figure 4:
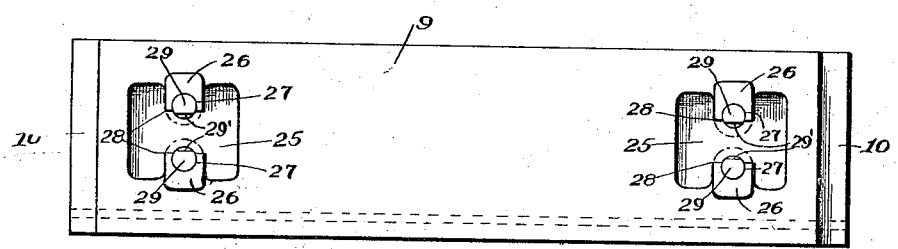
Figure 5:
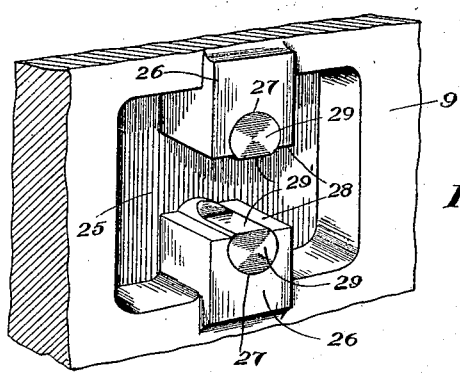

In the drawings accompanying this specification, Fig. 1 is a fragmentary vertical cross-sectional view through my punching machine, the section taken on line 1—1, Fig. 3; Fig. 2 is a fragmentary plan view of one end of the oscillating shaft, with a roll in position; Fig. 3 is a horizontal section of a portion of the machine, taken on line 3—3, Fig. 1; Fig. 4 is a back side elevation of the whole punch plate; and Fig. 5 is a fragmentary view, in perspective, of a portion of the punch plate showing the recessed portion which houses the driving pins.

Similar numerals refer to similar parts throughout the several views of the drawing.

Referring to Figs. 1 and 3, 1 represents the upper portion of the bed of the machine and 2 an end frame secured to the bed by the screws 3. Another end frame, not shown, and of the reverse hand of the one shown, is secured to the opposite end of the bed 1. At 4 is shown a table on which the material to be punched is placed in readiness to be pushed under the punches. 5 is a top table for storage purposes and extends, as does the table 4, the whole length of the machine. 6 is a shaft with a journal 7 running in a bearing 8 in the end frame 2,—this shaft having another journal, not shown, on its opposite end supported similarly to the one shown.

At 9 is a punch plate having ends 10 adapted to reciprocate vertically in guide-ways 11 in the frames 2. To confine this plate 9 within the bearing space 11, a front plate 12 is secured to the frames 2 by the screws 13. A back plate 14 extends across the machine and is secured to the frames by the screws 15. Extending rearwardly from the shaft 6 is an arm 16 having a bifurcated end 17, between the bifurcations of which is pivoted a connecting-rod 18, on the pin 19. This rod may be reciprocated by any suitable means, as for instance a crank.

At 20 is seen a punch head slidably mounted on the top of the bed 1, and with the rearward end 20′ held against vertical movement by the back plate 14. This head 20 has all the essential elements of a sub-press,— namely, a die 21, a punch 22, and a stripper 23. It is locked against longitudinal movement on the bed by the screw 24 bearing against the front plate 12, but may be adjusted along this plate to any position desired. Several of these heads may be assembled on the bed and operated simultaneously by the punch plate 9.

On the lower edge of the punch plate is cut a T slot 9′ which is made to receive the shouldered and headed end of the punch 22. In Fig. 4 the back side of the punch plate is shown. Near each end are rectangular depressions or cavities 25 extending nearly but not quite through the plate. Centrally located in the depressions are bosses 26 extending part way across the space and with their ends projecting slightly outside the back side of the plate. Before machining, the contour of these bosses on their inner or nearer sides is as shown in the dot and dash lines in Fig. 4. After drilling the holes 27, which extend entirely through the plate, these segmental sections embraced by the dot and dash lines are cut off to the lines 28. Into these holes 27 are then driven the hardened pins 29, the latter having flattened surfaces 29′ facing each other.

Near each journal of the shaft 6, on its forward side, are bifurcated projections, these bifurcations or ears 30 having holes 30′ drilled therein parallel to the axis of the shaft 6. Between these ears is a hardened, spherical faced roll 31, rotatably mounted on the pin 32,—the latter pressed firmly into the holes 30′. My object in providing these cavities 25 is to get the contact point of the roll with the pins as nearly as convenient on the vertical central line of action of the punches. The cutting away of the segmental portion of the bosses does not materially weaken the structure as the strain on the pins is in the opposite direction, where it is backed up or reinforced by the thick side of the bosses.

In Fig. 1 the position of the punch, punch plate and roll is "up," and the position of the pin 19 is "down,"—all the parts being shown in full lines. With a change in position in the reverse order, or from that shown in full to that shown in dot and dash lines, the roll 31 will have traveled through one full oscillation of the arm 16, and during this movement there will have been a slight rolling action of the roll 31,— first toward and then from the punch plate 9. In the central position of the lever 16 there will be absolutely no thrust on the punch plate, but in the extreme "up" and "down" positions of the roll there will be, theoretically, a tendency to thrust the plate first from and then towards the shaft, but this action is greatly discounted, in practice, by the ability of the roll to turn on its axis, thereby preventing any rubbing contact of the two surfaces impinging.

It will thus be apparent that with an easy rolling contact between the spherical faced roll 31 and the flat surface of the pins 29, the punch plate 9 will reciprocate in its guide-ways in the frames with much less friction and consume less power in the operation than is the case where racks and gear are used for the actuating means. It is also observable that replacement of the parts likely to be worn or injured can be made with trifling cost compared with the expense necessarily incurred when a tooth in the rack or gear becomes broken.

What I claim is:

1. In a punch-actuating mechanism for punching machines, the combination, with a base member, end frames mounted thereon, a shaft journalled in said end frames, an arm extending rearwardly from said shaft, and a reciprocable connecting-rod pivoted on the end of said arm, of a multiplicity of bifurcated projections on the forward side of said shaft, pins located in holes in said projections, said pins extending through both branches of the bifurcated portions, rolls loosely mounted upon said pins between the bifurcations of each projection, a punch-carrying plate, guiding means on the said frames to receive the end portions of said punch-carrying plate, means on the rearward side of said punch-carrying plate to provide contact with the opposite sides of said rolls on said shaft, whereby said plate may be reciprocated in a vertical direction by the oscillations of said shaft.

2. In a punch-actuating mechanism for punching machines, the combination, with a base member, end frames mounted thereon, a shaft journaled in said end frames, an arm extending rearwardly from said shaft, and a reciprocable connecting-rod pivoted on the end of said arm, of a multiplicity of bifurcated projections on the forward side of said shaft, pins located in holes in said projections, said pins extending through both branches of the bifurcated portions, spherical-faced rolls loosely mounted on said pins and between the bifurcations of each projection, a punch-carrying plate, guiding means on said end frames to receive the end portions of said punch-carrying plate, abutment bosses extending outwardly from cavities formed on the rearward side of said punch-carrying plate, one boss projecting out of the top and another out of the bottom of each of said cavities, with a spaced distance vertically intervening, pins located in open-sided holes within said abutment bosses, said holes positioned normal to the side of said punch-carrying plate, and said pins having their adjacent sides flattened for the purpose of providing contact surfaces for said spherical-faced rolls, the upper and lower pins bearing on the top and bottom, respectively, of said rolls, whereby a reciprocatory movement may be given said punch-carrying plate during the oscillations of said shaft, and means provided on the lower edge of said punch-carrying plate for adjustably securing punches thereto.

EUGENE A. SPAULDING.